United States Patent
Akiner et al.

(10) Patent No.: US 10,452,231 B2
(45) Date of Patent: Oct. 22, 2019

(54) USABILITY IMPROVEMENTS FOR VISUAL INTERFACES

(71) Applicant: INTERNATIONAL BUSINESS MACHINES CORPORATION, Armonk, NY (US)

(72) Inventors: Veli Akiner, Essex (GB); Benjamin A. Confino, Chandler's Ford (GB); Fenghui Jiang, Eastleigh (GB); Martin A. Ross, Hampshire (GB); Bradley G. Whitehouse, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 14/751,914

(22) Filed: Jun. 26, 2015

(65) Prior Publication Data

US 2016/0378274 A1     Dec. 29, 2016

(51) Int. Cl.
| | |
|---|---|
| *G06F 3/0482* | (2013.01) |
| *G06F 3/0484* | (2013.01) |
| *G06F 9/451* | (2018.01) |
| *G06F 8/38* | (2018.01) |

(52) U.S. Cl.
CPC ........ *G06F 3/0482* (2013.01); *G06F 3/04842* (2013.01); *G06F 3/04847* (2013.01); *G06F 8/38* (2013.01); *G06F 9/451* (2018.02)

(58) Field of Classification Search
CPC .............. G06F 3/0482; G06F 3/04842; G06F 3/04847; G06F 8/38; G06F 9/4443
See application file for complete search history.

(56) References Cited

U.S. PATENT DOCUMENTS

| | | | | |
|---|---|---|---|---|
| 5,041,967 | A * | 8/1991 | Ephrath | G06F 9/4443 715/825 |
| 6,564,217 | B2 * | 5/2003 | Bunney | G06F 17/3089 |
| 6,697,781 | B1 * | 2/2004 | Sahlberg | G10L 13/00 704/260 |
| 6,732,102 | B1 * | 5/2004 | Khandekar | G06F 17/3061 |
| 7,290,245 | B2 * | 10/2007 | Skjolsvold | G06F 3/0481 715/762 |
| 7,568,153 | B2 * | 7/2009 | Rethore | G06F 8/38 715/202 |

(Continued)

OTHER PUBLICATIONS

Akiner et al., Office Action for U.S. Appl. No. 14/751,984, filed Jun. 26, 2015, dated Jun. 28, 2017 (21 pages).

(Continued)

*Primary Examiner* — Jung-Mu T Chuang
(74) *Attorney, Agent, or Firm* — Heslin Rothenberg Farley & Mesiti P.C.; Robert Shatto, Esq.

(57) ABSTRACT

One or more aspects relate to a screen reader. Markup code for a visual interface containing at least one visual control is located. A screen reader menu for the visual interface is created. A visual control name and screen location, both corresponding to the at least one visual control, are extracted from the markup code. A menu item is generated in the screen reader menu corresponding to the at least one visual control. The menu item is set to simulate an action at the screen location corresponding to the at least one visual control on selection of the menu item whereby on user selection of the menu item the action is simulated at the screen location corresponding to the at least one visual control.

15 Claims, 6 Drawing Sheets

(56) References Cited

U.S. PATENT DOCUMENTS

| | | | | |
|---|---|---|---|---|
| 7,653,544 B2* | 1/2010 | Bradley | G06Q 50/01 | 704/260 |
| 7,727,060 B2* | 6/2010 | Mills | A63F 1/00 | 273/292 |
| 7,765,496 B2* | 7/2010 | Bernstein | G06F 3/0481 | 715/865 |
| 8,042,132 B2* | 10/2011 | Carney | G06Q 30/02 | 709/217 |
| 8,122,342 B2* | 2/2012 | Karle | G06F 17/2247 | 715/234 |
| 8,196,104 B2* | 6/2012 | Cohrs | G06F 11/3672 | 717/124 |
| 8,302,151 B2* | 10/2012 | Jones | G06F 21/6218 | 340/384.73 |
| 8,347,267 B2* | 1/2013 | Givoni | G06F 11/3414 | 714/703 |
| 8,374,874 B2* | 2/2013 | Cross, Jr. | G10L 15/22 | 704/270 |
| 8,468,445 B2* | 6/2013 | Gupta | G06F 17/30908 | 715/205 |
| 8,493,344 B2* | 7/2013 | Fleizach | G06F 3/04883 | 345/173 |
| 8,533,811 B2* | 9/2013 | Bruno | H04M 1/66 | 713/175 |
| 8,645,848 B2* | 2/2014 | Lesh | G06F 3/0482 | 715/760 |
| 8,667,467 B2* | 3/2014 | Dubey | G06F 8/30 | 717/124 |
| 8,751,971 B2* | 6/2014 | Fleizach | G06F 3/0488 | 715/810 |
| 9,372,838 B2* | 6/2016 | Gupta | G06F 17/30908 | |
| 9,407,608 B2* | 8/2016 | Mullick | H04L 63/0272 | |
| 2001/0044809 A1* | 11/2001 | Parasnis | G06F 9/4448 | 715/201 |
| 2002/0085020 A1* | 7/2002 | Carroll, Jr. | G06F 8/38 | 715/700 |
| 2002/0120645 A1* | 8/2002 | Adapathya | G06F 17/30905 | 715/205 |
| 2002/0174147 A1* | 11/2002 | Wang | G06F 17/30899 | 715/234 |
| 2002/0178007 A1* | 11/2002 | Slotznick | G09B 5/06 | 704/270.1 |
| 2003/0197744 A1* | 10/2003 | Irvine | G06F 3/038 | 715/856 |
| 2003/0204815 A1* | 10/2003 | Edwards | G06F 17/30899 | 715/205 |
| 2004/0003400 A1* | 1/2004 | Carney | G06Q 30/02 | 725/42 |
| 2004/0031058 A1* | 2/2004 | Reisman | G06F 17/30873 | 725/112 |
| 2005/0021611 A1* | 1/2005 | Knapp | G06F 17/30867 | 709/203 |
| 2005/0034063 A1* | 2/2005 | Baker | G06F 17/2247 | 715/241 |
| 2005/0071165 A1* | 3/2005 | Hofstader | G09B 21/006 | 704/270.1 |
| 2005/0216834 A1* | 9/2005 | Gu | G06F 17/212 | 715/248 |
| 2005/0233287 A1* | 10/2005 | Bulatov | G09B 21/006 | 434/114 |
| 2005/0246653 A1* | 11/2005 | Gibson | G06F 17/30899 | 715/773 |
| 2005/0273762 A1* | 12/2005 | Lesh | G06F 9/451 | 717/115 |
| 2006/0159366 A1* | 7/2006 | Darwish | G06F 17/30017 | 382/276 |
| 2006/0178898 A1* | 8/2006 | Habibi | G06Q 10/10 | 705/1.1 |
| 2006/0192846 A1* | 8/2006 | Gruber | G11B 19/022 | 348/14.01 |
| 2007/0050708 A1* | 3/2007 | Gupta | G06F 17/30908 | 715/235 |
| 2007/0053513 A1* | 3/2007 | Hoffberg | G06K 9/00369 | 380/201 |
| 2007/0168891 A1* | 7/2007 | Damery | G10L 13/00 | 715/865 |
| 2007/0180387 A1* | 8/2007 | Gravina | G06F 3/023 | 715/746 |
| 2007/0180479 A1* | 8/2007 | Gravina | G06F 3/0231 | 725/87 |
| 2007/0198945 A1* | 8/2007 | Sun | G09B 21/006 | 715/779 |
| 2007/0208687 A1* | 9/2007 | O'Conor | G06F 17/30899 | |
| 2007/0211071 A1* | 9/2007 | Slotznick | G06F 17/30899 | 345/594 |
| 2008/0126984 A1* | 5/2008 | Fleishman | G06F 9/4443 | 715/810 |
| 2011/0099499 A1* | 4/2011 | Pnueli | G06F 8/38 | 715/771 |
| 2011/0161797 A1* | 6/2011 | Dewar | G06F 16/986 | 715/234 |
| 2011/0177792 A1* | 7/2011 | Bruno | H04M 1/66 | 455/411 |
| 2011/0197124 A1* | 8/2011 | Garaventa | G06F 16/972 | 715/234 |
| 2011/0239139 A1* | 9/2011 | Lee | G06F 3/017 | 715/760 |
| 2011/0283187 A1* | 11/2011 | Tibbett | G06Q 10/10 | 715/255 |
| 2011/0307259 A1* | 12/2011 | Bradley | G06Q 50/01 | 704/270.1 |
| 2011/0320947 A1* | 12/2011 | Kim | G06F 17/30572 | 715/716 |
| 2012/0023485 A1* | 1/2012 | Dubey | G06F 8/30 | 717/125 |
| 2012/0227000 A1* | 9/2012 | McCoy | G06F 3/0482 | 715/762 |
| 2012/0242581 A1* | 9/2012 | Laubach | G06F 3/04812 | 345/168 |
| 2012/0290917 A1* | 11/2012 | Melnyk | G06F 17/30905 | 715/234 |
| 2012/0311508 A1* | 12/2012 | Fleizach | G06F 3/0488 | 715/863 |
| 2013/0071027 A1* | 3/2013 | Sato | G06K 9/00463 | 382/176 |
| 2013/0196591 A1* | 8/2013 | Ikeda | H04N 1/00007 | 455/11.1 |
| 2013/0290857 A1* | 10/2013 | Beveridge | G06F 3/0484 | 715/740 |
| 2013/0326332 A1* | 12/2013 | Gupta | G06F 17/30908 | 715/234 |
| 2013/0326345 A1* | 12/2013 | Haggart | G06F 17/24 | 715/255 |
| 2014/0013234 A1* | 1/2014 | Beveridge | G06F 3/0484 | 715/740 |
| 2014/0168716 A1* | 6/2014 | King | G06Q 10/10 | 358/473 |
| 2014/0180846 A1* | 6/2014 | Meron | G06F 17/2247 | 705/14.73 |
| 2014/0215329 A1* | 7/2014 | Zilberman | G06F 3/167 | 715/702 |
| 2015/0113410 A1* | 4/2015 | Bradley | G10L 13/04 | 715/728 |
| 2015/0205882 A1* | 7/2015 | Vukas | G06F 17/30899 | 707/758 |
| 2015/0243288 A1* | 8/2015 | Katsuranis | G06F 3/0484 | 704/275 |
| 2015/0249872 A1* | 9/2015 | Lee | G06Q 30/06 | 725/32 |
| 2016/0086516 A1* | 3/2016 | Beranek | G06F 9/44526 | 715/709 |
| 2016/0148409 A1* | 5/2016 | Fleizach | G06F 3/0488 | 715/267 |

(56) References Cited

U.S. PATENT DOCUMENTS

2016/0337426 A1* 11/2016 Shribman ........... H04L 65/4084
2016/0357420 A1* 12/2016 Wilson ................ G06F 3/04847

OTHER PUBLICATIONS

"Remediation Through Customization of Access Technology: Commonly called Screen Reader Script Writing," Virtual Vision Technologies, downloaded from internet Jun. 11, 2015 (no further date information available), pp. 1-4.

"Do I Need JAWS Scripting?", Even Grounds Accessibility Consulting, downloaded from internet Mar. 15, 2016 (no further date information available), pp. 1-3.

"JAWS Scripting," Tampa Lighthouse for the Blind, downloaded from internet Mar. 15, 2016 (no further date information available), pp. 1-2.

Akiner et al., "Screen Reader Improvements," U.S. Appl. No. 14/751,984, filed Jun. 26, 2015, pp. 1-32.

List of IBM Patents or Patent Applications Treated as Related, Mar. 11, 2016, 2 pages.

Akiner et al., Final Office Action for U.S. Appl. No. 14/751,984, filed Jun. 26, 2015 (U.S. Patent Publication No. 2016/0378275 A1), dated Nov. 14, 2017 (24 pages).

* cited by examiner

FIGURE 1

Visual Reader Module 200

Markup Code Probe 202

Menu Factory 204

Visual Control Extractor Engine 206

Menu Item Factory 208

Menu Controller 210

Visual Reader Method 300

```xml
<?xml version="1.0" encoding="UTF-8"?>
<Application name="Sample Application">
  <composition>
    <nodes type="ComIbmMQInput.msgnode" displayName="MQInputNode" id="FCMComposite_1_1" location="89,97" queueName="CSIM_SERVER_IN_Q" connection="SERVER" destinationQueueManagerName="CSIM" transactionMode="no"/>
    <nodes type="ComIbmMQOutput.msgnode" displayName="MQOutputNode" id="FCMComposite_1_2" location="258,97" queueName="CSIM_COMMON_REPLY_Q" connection="SERVER" destinationQueueManagerName="CSIM" transactionMode="no" persistenceMode="no"/>
    <connections type="FCMConnection" id="FCMConnection_1" targetNode="FCMComposite_1_2" sourceNode="FCMComposite_1_1" sourceTerminalName="OutTerminal.out" targetTerminalName="InTerminal.in"/>
    <graphics>
      <colorGraphic type="ComIbmMQInput.msgnode" resource="icon1.gif" width="32" height="32"/>
      <colorGraphic type="ComIbmMQOutput.msgnode" resource="icon2.gif" width="32" height="32"/>
    </graphics>
  </composition>
</Application>
```

USABILITY IMPROVEMENTS FOR VISUAL INTERFACES

BACKGROUND

One or more aspects relate to visual interfaces. In particular, one or more aspects relate to improving the usability of a visual interface.

One or more aspects operate in the general environment of screen readers and applications with visual interfaces, such as a visual integrated development environment (visual IDE).

Users of screen readers typically have three ways of moving around a screen, the arrow keys, the tab key or special keystrokes which are either built into the screen reader or the application itself. It is a common experience for a screen reader user not to reach a part of an application screen comprising a visual control and also not to be able to activate a visual control in part of an application screen that a user can access. So users with no vision may not even know there are unreachable screen parts because a screen cursor cannot always reach or see every screen part. The net result is that screen reader users have limited access to applications and should not assume that they will be able to access every visual control on a new application.

An example application that uses visual controls that are not normally accessible to a screen reader is a visual IDE. Visually impaired users are unable to navigate a visual development canvas, and thus cannot readily access or generate visual controls (for example message flow controls). A solution is required to enable visually impaired users to access these visual controls and other graphical user interface (GUI) elements in order to create and modify applications (for example message flow applications).

SUMMARY

In a first aspect of the invention, there is provided a screen reader comprising a markup code probe to locate markup code for a visual interface containing at least one visual control; a user menu factory to create a screen reader user menu for the visual interface; a visual control extraction engine to extract properties from the at least one visual control, the properties including a visual control name and a visual control screen location, corresponding to the at least one visual control; a menu item factory to generate a menu item in the screen reader menu corresponding to the at least one visual control; and a menu controller to set the menu item to simulate an action at the screen location corresponding to the at least one visual control on selection of the menu item whereby on user selection of the menu item the action is simulated at the screen location corresponding to the at least one visual control.

In one embodiment, a user interface is created that is for a screen reader arrow key input but any other input could be used including a numbered menu item or programmable shortcut keys or non-keyboard input such as voice recognition.

In one embodiment, the visual control extraction engine is also for extracting visual control actions however, an embodiment can work by assuming that the visual control action is one or more of: a right mouse click; a left mouse click; a cursor hover or a visual control selection.

The embodiments describe analyzing the underlying markup code for a visual interface (for example extendable markup language (XML) code describes the message flow in a message flow integrated development environment) to get coordinates of at least one visual control (sometimes called a node) and provide an accessible menu (for example an arrow key menu) to simulate mouse clicks, mouse hovers or other user selection or user visual interface action. This enables a visually impaired user to achieve focus on a control node within the visual interface (for example a canvas) to expose a further menu or menus (for example panels) appropriate to that visual control (for example properties of a message flow input node).

One or more embodiments create appropriate accessible items, for instance an additional menu that is generated based on analysis of the markup code underlying the visual interface. The embodiments access the source of the visual interface using appropriate application programming interfaces (for example: "locate source" in an integrated development environment or a typical Internet browser).

The embodiments provide access for visual environments (for example visual integrated development environments) for impaired users and provide enhanced access to those applications for sighted users.

In a second aspect of the invention, there is provided a method for a screen reader comprising locating markup code for a visual interface containing at least one visual control; creating a screen reader menu for the visual interface; extracting from the markup code a visual control name and a screen location, corresponding to the at least one visual control; generating a menu item in the screen reader menu corresponding to the at least one visual control; and setting the menu item to simulate an action at the screen location corresponding to the at least one visual control on selection of the menu item whereby on user selection of the menu item the action is simulated at the screen location corresponding to the at least one visual control.

In one embodiment, the steps of extracting, generating and setting are performed for each visual control in the markup code for the visual interface.

Further, the method further includes locating a dependent visual control depending from the at least one visual control and extracting from the markup code a dependent visual control name and screen location, corresponding to the at least one visual control.

In one or more aspects, the method further includes locating a doubly dependent visual control depending from the at least one dependent visual control and extracting from the markup code a doubly dependent visual control name and screen location, all corresponding to the at least one visual control.

Yet further, the method includes extracting from the markup code further descriptive information relating to the visual control and making such further descriptive information available from the menu item.

In a third aspect of the invention, there is provided a computer program product for a screen reader, the computer program product comprising a computer readable storage medium having program instructions embodied thereon, the program instructions executable by a processor to cause the processor to locate markup code for a visual interface containing at least one visual control; create a screen reader menu for the visual interface; extract from the markup code, a visual control name and screen location, both corresponding to the at least one visual control; generate a menu item in the screen reader menu corresponding to the at least one visual control; and set the menu item to simulate an action at the screen location corresponding to the at least one visual control on selection of the menu item whereby on user selection of the menu item the action is simulated at the screen location corresponding to the at least one visual control.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

BRIEF DESCRIPTION OF THE DRAWINGS

Embodiments of the present invention will now be described, by way of example only, with reference to the following drawings in which.

DETAILED DESCRIPTION

Figure 1:
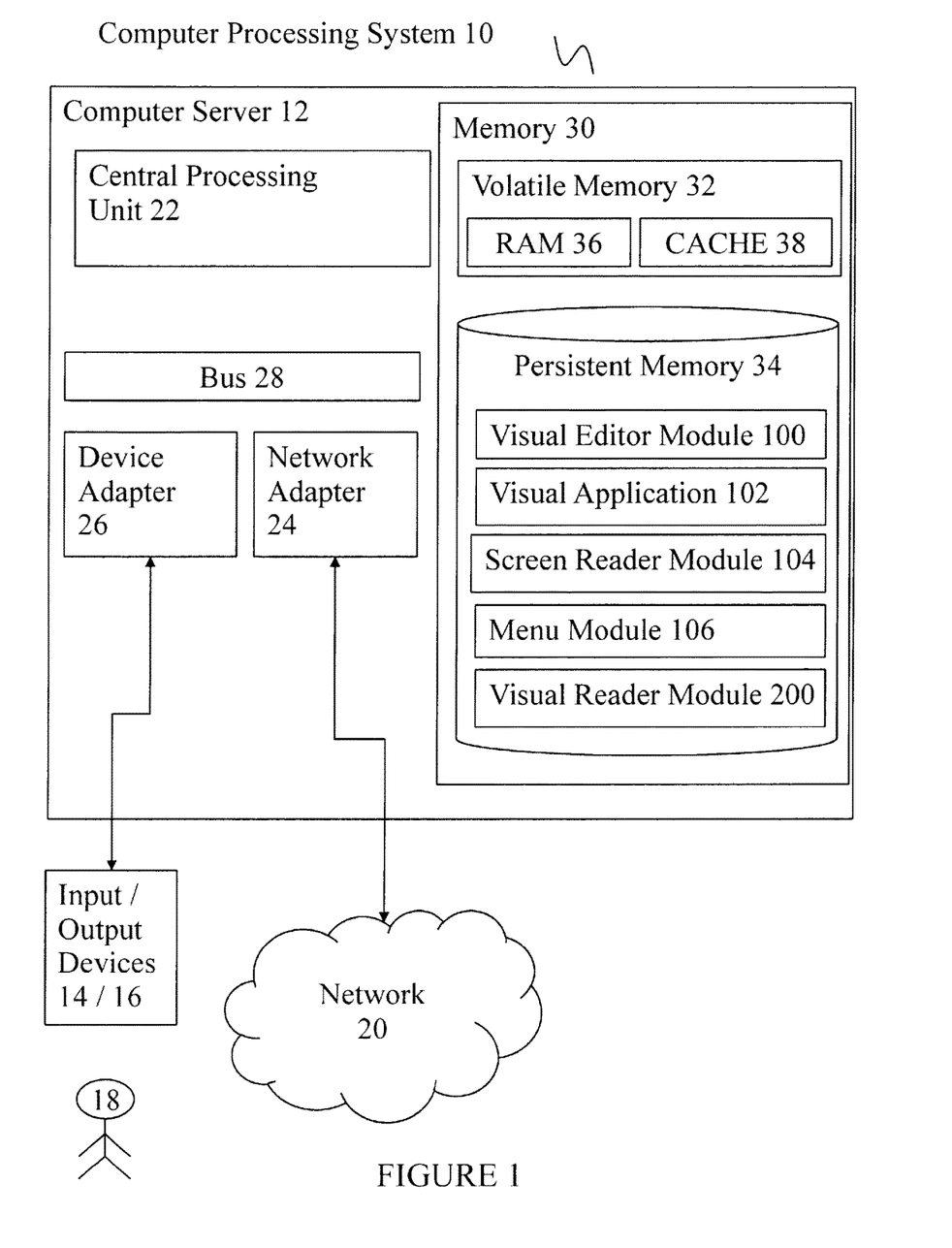
FIG. 1 is a deployment diagram of one embodiment.

Referring to FIG. 1, the deployment of a one embodiment in a computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment may include a cloud computing environment for example where a computer processing system is a third party service performed by one or more of a plurality of computer processing systems. A distributed computer environment may also include an Internet of Things computing environment for example where computer processing systems are distributed as a network of objects that can interact with a computing service.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 includes a general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 includes a central processing unit (CPU) 22; a network adapter 24; a device adapter 26; a bus 28 and memory 30.

CPU 22 loads machine instructions from memory 30 and performs machine operations in response to the instructions. Such machine operations include, for instance, incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, and the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 includes a program product having a set of program modules that are configured to carry out the functions of embodiments of the invention.

The set of program modules includes, for instance, visual editor module 100; visual application 102; screen reader module 104; menu module 106; and visual reader module 200. In one embodiment, ROM in memory 30 stores the modules that enables the computer server 12 to function as a special purpose computer specific to the modules. Further program modules that support one or more embodiments but are not shown include, for instance, firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to, microcode, device drivers, redundant processing units, external disk drive arrays, redundant array of independent disks (RAID), tape drives, and data archival storage systems.

Visual editor module 100 is typically a visual integrated development environment whereby an application can be edited in a text mode or in a graphical user interface.

Visual application 102 is a program that is edited by the visual editor module 100. Primarily the application is a coded application in a language such as hypertext markup language or extensible markup language.

Screen reader module 104 has typical screen reader functionality for accessible parts of a computer screen except that it interacts with a visual reader module of one or more embodiments to reach inaccessible parts of an application screen (in this example the visual application 102 as edited by visual editor module 100).

Menu module 106 is a resultant data file of one or more embodiments used by the screen reader module 104 that describes for the screen reader module 104 the created reader elements corresponding to the visual application 102 so that the screen reader module 104 reads the created reader elements as a menu of items. In one embodiment, an arrow menu user interface is created for screen reader arrow key input, but any other type of input could be used, including a numbered menu item or programmable shortcut keys or non-keyboard input, such as voice recognition.

Visual reader module 200 comprises functionality of one or more embodiments and is described in more detail below.

Figure 2:
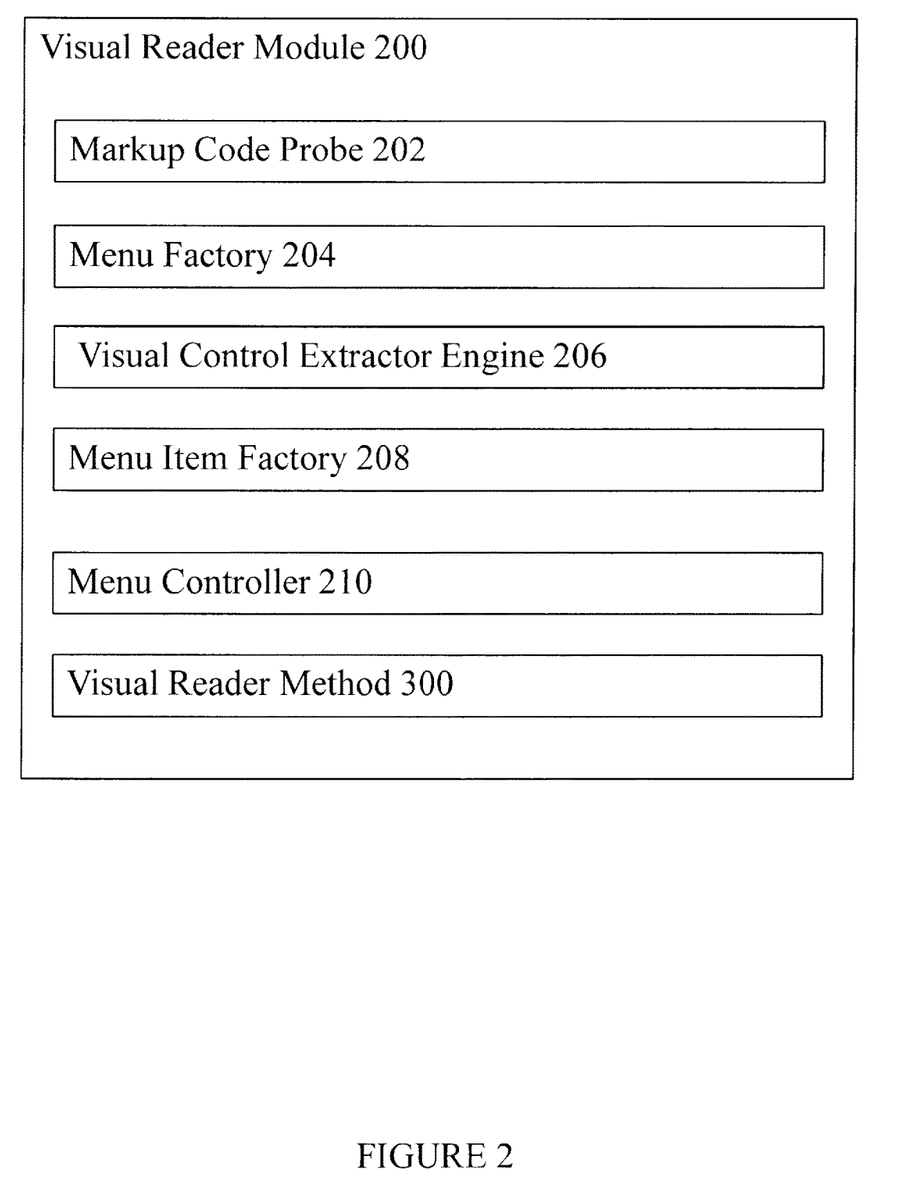
FIG. 2 is a component diagram of one embodiment.

Referring to FIG. 2, visual reader module 200 comprises, for instance, the following components: markup code probe 202; menu factory 204; visual control extractor engine 206; menu item factory 208; menu controller 210; and visual reader method 300.

Markup code probe 202 is for locating markup code for a visual interface containing at least one visual control. In one embodiment, markup code probe 202 is further for locating at least one dependent visual control depending from the at least one visual control. In one embodiment, markup code probe 202 is further for locating at least one doubly dependent visual control depending from the at least one dependent visual control, and the visual control extraction engine is further for extracting from the markup code, a dependent visual control name and screen location, both corresponding to the at least one doubly dependent visual control.

Menu factory 204 is for creating a screen reader menu for the visual interface.

Visual control extraction engine 206 is for extracting from the markup code: visual control name and screen location, all corresponding to the at least one visual control. In one embodiment, visual control extractor engine 206 is further for performing the steps of extracting, generating and setting for each visual control in the markup code for the visual interface. Also, in one embodiment, visual control extractor engine is further for extracting from the markup code further descriptive information relating to the visual control and making such further descriptive information available from the arrow menu item. For instance, the visual control may have a visual control label; and a visual control hover description. It is envisaged that the visual control extractor engine is also for extracting visual control actions; however, one embodiment works by assuming that the visual control action is one or more of a right mouse click; a left mouse click; a cursor hover or a visual control selection.

Menu item factory 208 is for generating a menu item in the menu corresponding to the at least one visual control.

Menu controller 210 is for setting the menu item to simulate the action at the screen location corresponding to the at least one visual control on selection of the menu item.

Figure 3A:
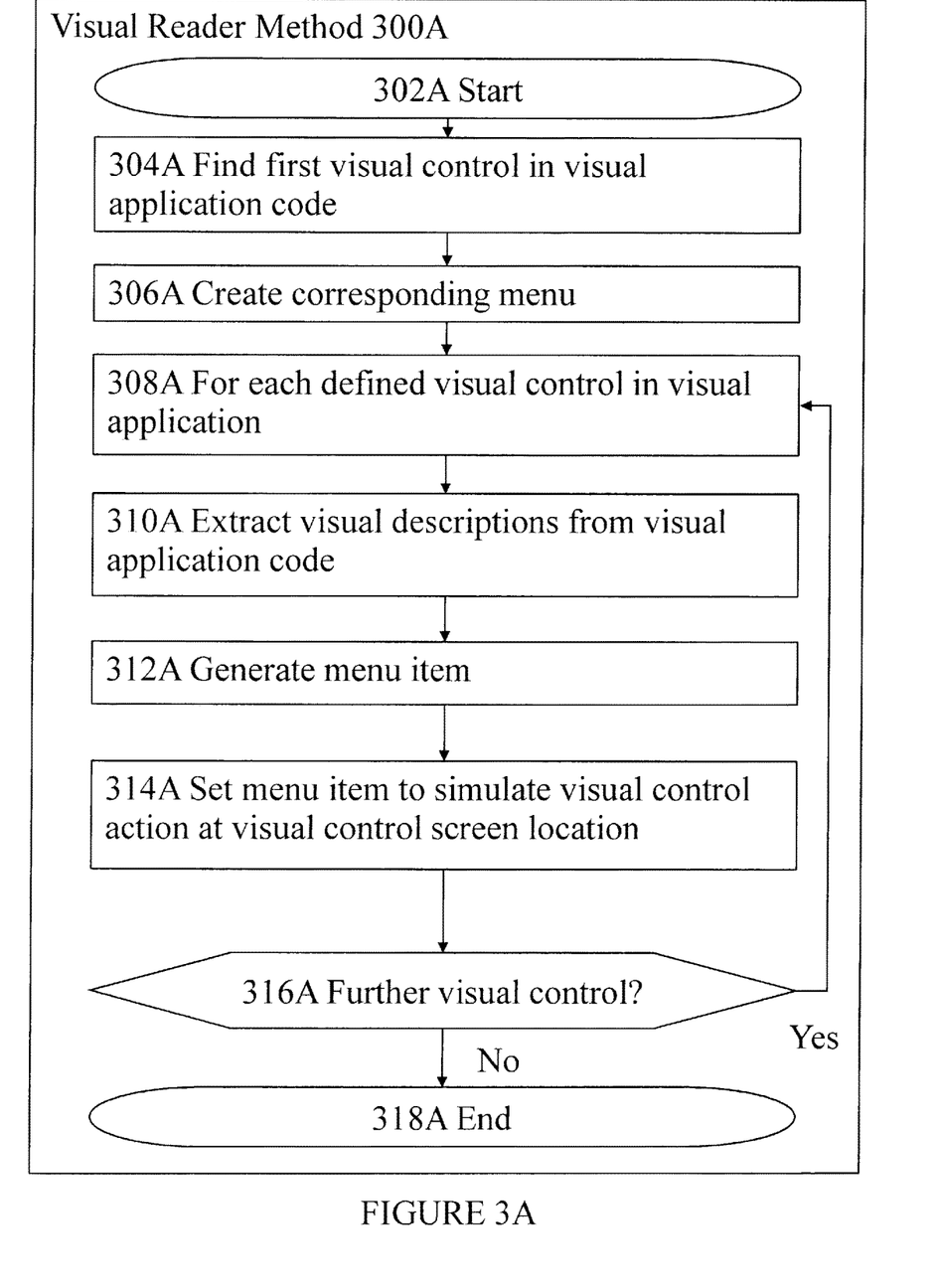
FIG. 3A is a flow diagram of a process of one embodiment.
Figure 3B:
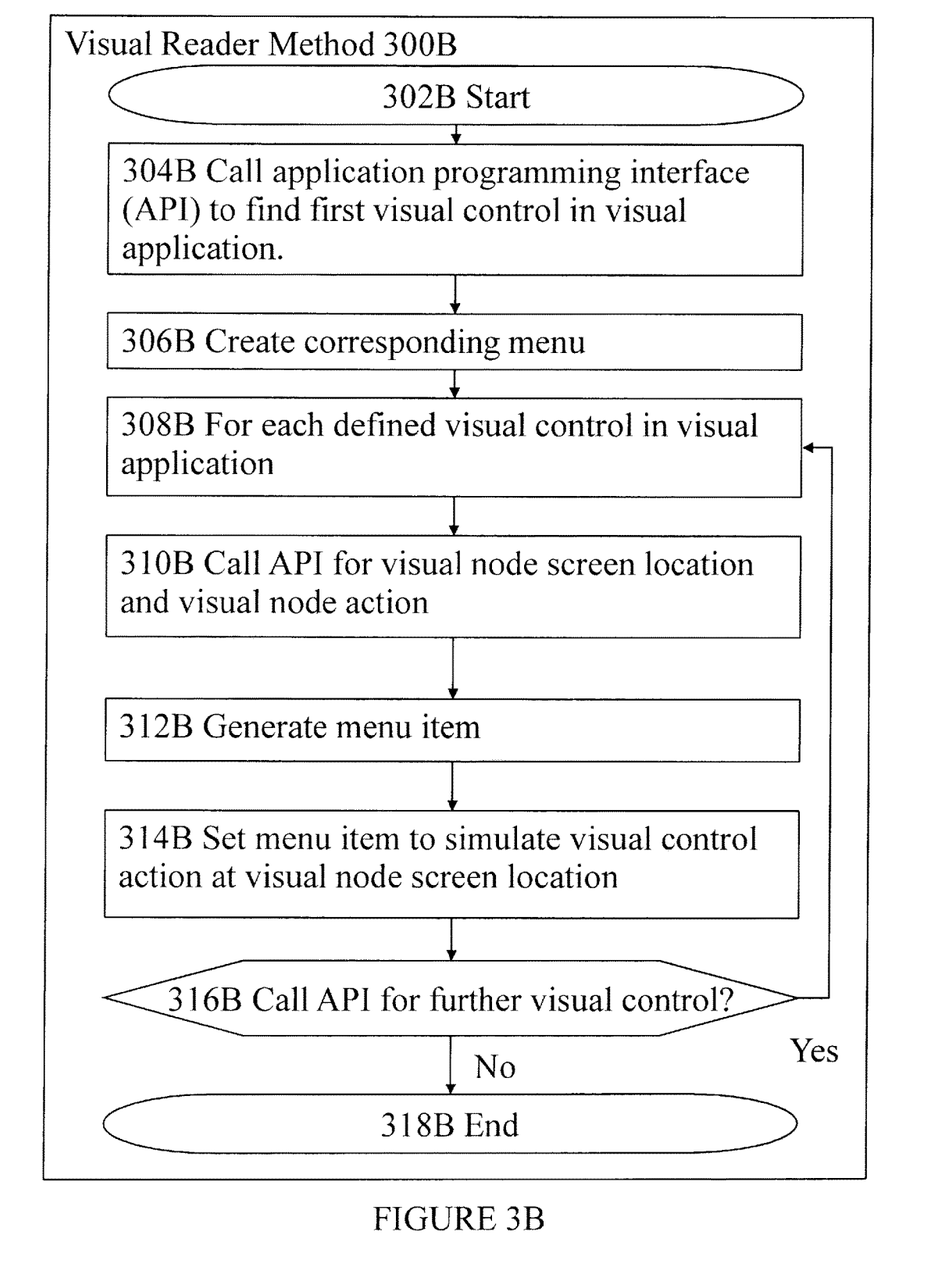
FIG. 3B is a flow diagram of a process of another embodiment.

Visual reader method 300 is for controlling the above components according to a method 300A of one embodiment or method 300B of another embodiment, both described in more detail below.

Referring to FIG. 3A, visual reader method 300 comprises visual reader method 300A in one embodiment including logical process steps 302A to 318A.

Step 302A is the start of the method when screen reader application requests source information for any graphical user interfaces on the screen.

Step 304A is for locating markup code or source information for a graphical user interface containing at least one visual control by calling an application program interface for the visual editor or for the operating system. The markup code is then searched for a first visual control.

Step 306A is for creating a screen reader menu for the visual application.

Step 308A is for defining a loop for all the visual controls in the visual application.

Step 310A is for extracting from the markup code visual descriptions comprising: visual control name and screen location, all corresponding to the at least one visual control. In one embodiment, the markup code visual descriptions further comprise: a visual control label; and a visual control hover description. One embodiment assumes that the control action is one of: a left mouse click, a right mouse click; a hover; or a selection. However, it is envisaged that the control action could also be extracted from the markup code.

Step 312A is for generating a menu item in the screen reader menu corresponding to the at least one visual control.

Step 314A is for setting the menu item to simulate the action at the screen location corresponding to the at least one visual control on selection of the menu item.

Step 316A is for looping back to step 308A for each visual control in the visual application. In one embodiment, each defined visual control comprises all dependent visual controls and all further dependent visual controls when there is a hierarchy of dependent visual controls.

Step 318A is the end of visual reader method 300A.

Referring to FIG. 3B, visual reader method 300 comprises visual reader method 300B in an alternative embodiment including logical process steps 302B to 318B.

Step 302B is the start of the method when screen reader application requests source information for any graphical user interfaces on the screen.

Step 304B is for calling an operating system application programming interface (API) to find the visual application and a first visual control in the visual application.

Step 306B is for creating a screen reader menu for the visual application.

Step 308B is for defining a loop for all the visual controls in the visual application.

Step 310B is for calling an application programming interface (API) in relation to the located visual control to locate visual descriptions comprising: visual control name and screen location, all corresponding to the at least one visual control. In one embodiment, the markup code visual descriptions further comprise: a visual control label; and a visual control hover description. In a variation, the visual control action (for example selecting the control with a left or right mouse click or hovering over mouse) may be determined by calling an API.

Step 312B is for generating a menu item in the screen reader menu corresponding to the at least one visual control.

Step 314B is for setting the menu item to simulate the action at the screen location corresponding to the at least one visual control on selection of the menu item.

Step 316B is for looping back to step 308B for each visual control in the visual application. In one embodiment, each defined visual control comprises all dependent visual controls and all further dependent visual controls when there is a hierarchy of dependent visual controls.

Step 318B is the end of visual reader method 300B.

Figure 4:
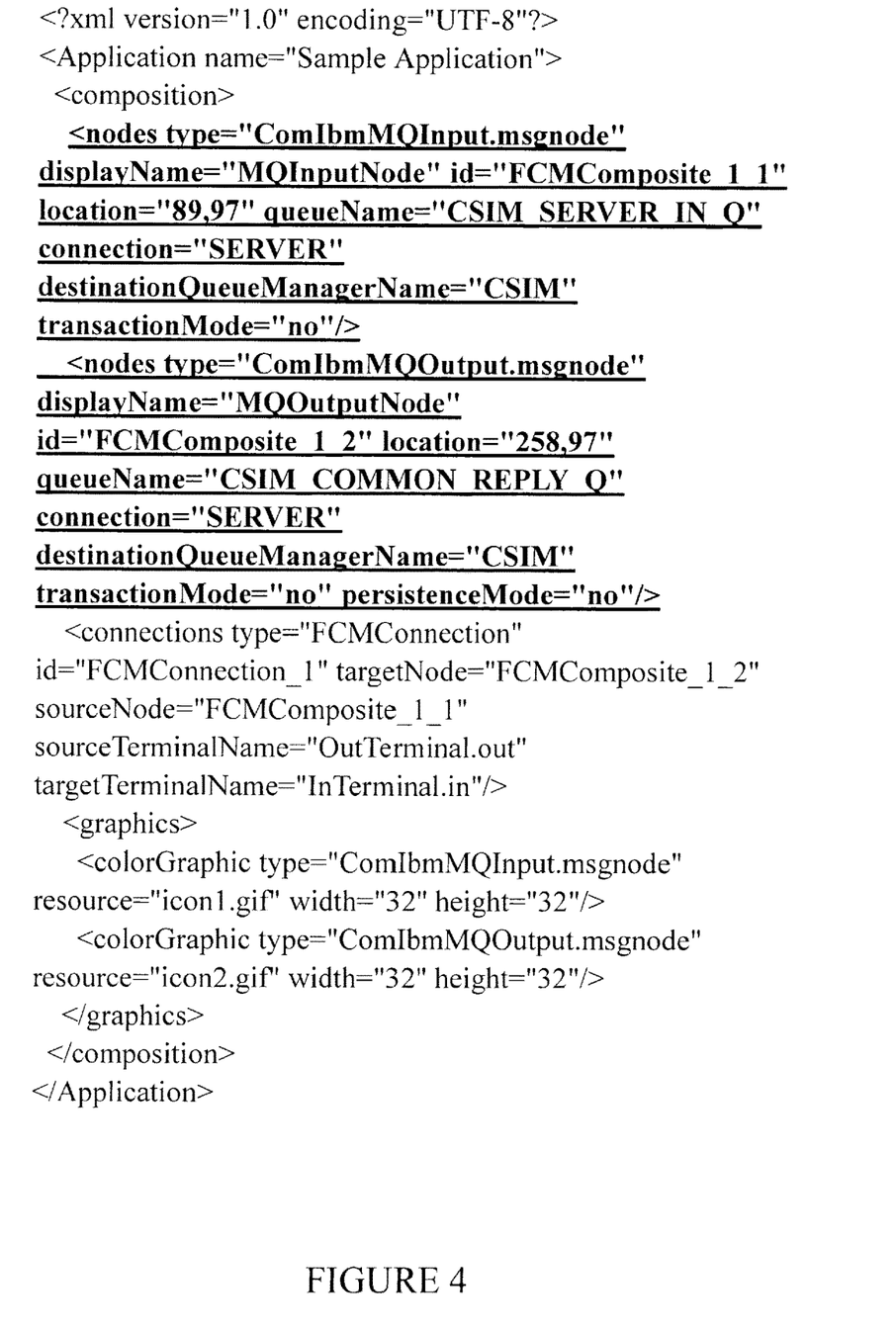
FIG. 4 is a printout of source code for an example visual interface.
Figure 5A:
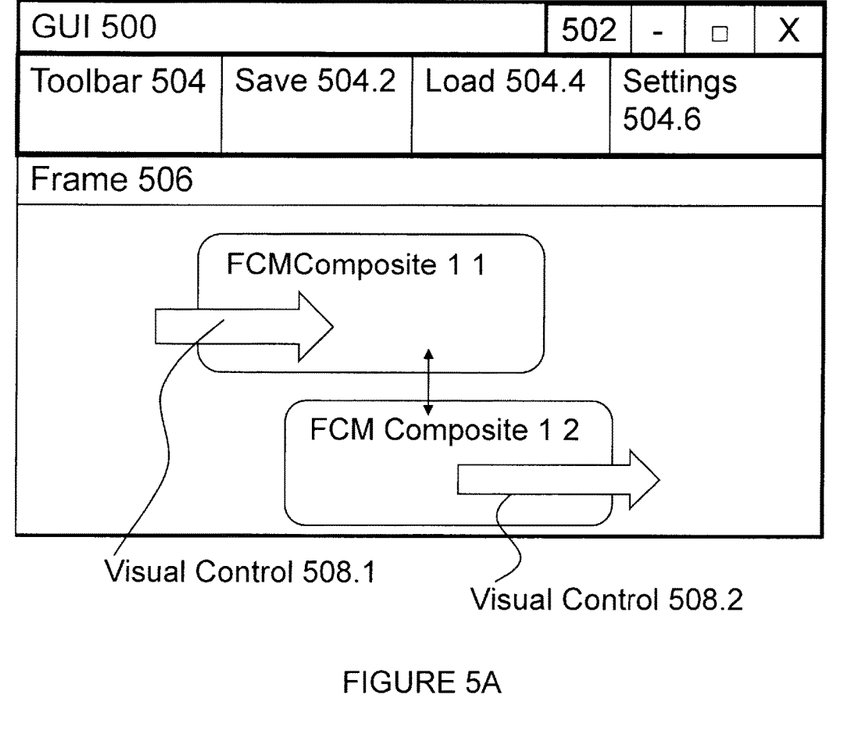
FIG. 5A is a screen shot of the example visual interface.
Figure 5B:
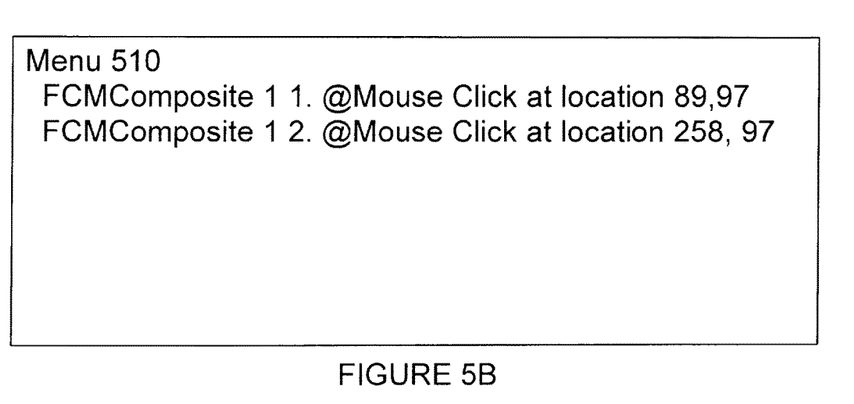
FIG. 5B is a printout of an arrow menu corresponding to the example visual interface.

Referring to FIG. 4, an example markup code visual application is shown in extensible markup language (XML). The graphical representation of the markup code is shown in FIG. 5A and an arrow menu representation is shown in FIG. 5B.

The first line of the code states that version 1.0 of XML is used throughout.

The second line defines an "Application" element which has a child "composition" element. The "composition" element in turn has 3 child elements: node elements; connections elements; and graphic elements.

Two node elements are defined in the code, one for each node on the canvas. Each node element has attributes for the node type ("type"), a display name ("displayName"), the X,Y coordinates of the top left corner of the associated graphic on the canvas ("location") and some additional properties associated with the node, in this case "queueName", "connection", "destinationQueueManagerName" and "transactionMode". The runtime environment is for instantiating a node element.

The first node element is shown in underlined bold and reproduced below:

```
<nodes
    type="ComIbmMQInput.msgnode"_displayName=
      "MQInputNode"
    id="FCMComposite_1_1"_location="89,97"
    queueName="CSIM_SERVER_IN_Q"_connection=
      "SERVER"
    destinationQueueManagerName="CSIM"_
    transactionMode="no"/>
```

The tag "nodes type=" defines an input control (generally called nodes in this example application) called "FCMComposite_1_1" at location coordinates 89, 97. The node type that will be instantiated is a definition held by the run time environment called "ComIbmMQInput.msgnode".

Second control defining code lines are shown in bold and reproduced below:

```
<nodes
    type="ComIbmMQOutput.msgnode"displayName=
      "MQOutputNode"
    id="FCMComposite_1_2"_location="258,97"
    queueName="CSIM_COMMON_REPLY_Q"_
      connection="SERVER"
    destinationQueueManagerName="CSIM"_
    transactionMode="no"
    persistenceMode="no"/>
```

The tag "nodes type=" defines an output control called "FCMComposite_1_2" at location 258, 97.

There is only one connection here in that the first node is connected to the second node. The connection has a "type" and an "id", the attributes then further define that the connection is between the "OutTerminal.out" terminal ("sourceTerminalName") of a first node with id 'FCMComposite_1_1' ("sourceNode") and the "InTerminal.in" terminal ("targetTerminalName") of a second node with id 'FCMComposite_1_2' ("targetNode")—thus a connection from the MQInputNode to the MQOutputNode.

```
<connections_type="FCMConnection"_id=  "FCMConnection_1"
    targetNode="FCMComposite_1_2"_sourceNode=
      "FCMComposite_1_1"
    sourceTerminalName="OutTerminal.out"
    targetTerminalName="InTerminal.in"/>
```

Graphic elements define the graphic icons associated with each of the nodes by type. Both are 32×32 pixels ("width" and "height" attributes) with the "resource" attribute defining the file containing the associated graphic for a node with a type as defined by the "type" attribute (thus can be cross-referenced to the "type" attribute for the "nodes" elements).

```
<colorGraphic_type="ComIbmMQInput.
    msgnode"_resource="icon1.gif"
    width="32"_height="32"/>
  <colorGraphic_type="ComIbmMQOutput.
    msgnode"_resource="icon2.gif"
    width="32"_height="32"/>
```

Referring to FIG. 5A, there is shown an example screen showing a state of a graphical user interface (GUI) 500 of one embodiment. GUI 500 comprises: window control 502; toolbar 504; and frame 506.

Window control 502 provides for minimizing, maximizing and closing of GUI 500.

Toolbar 504 provides the following controls: save 504.2; load 504.4; and settings 504.6.

Save 504.2 is a control for saving input data in a particular state.

Load 504.4 is a control for loading prompt and user data. Saving and loading of prompt and user data.

Setting 504.6 provides a user control to change a setting for opening GUI 500.

Operating system controls, like 502 and 504, are normally accessible to a screen reader because they are operating system based. However, in our example frame 506 is not accessible because it is a proprietary application and not operating system based.

Frame 506 is for displaying the graphical user interface of a visual application that is inaccessible to a normal screen reader because it is application based. Frame 506 comprises input visual control 508.1 (represented by an input icon) and output visual control 508.2 (represented by an output icon). Both visual controls are normally inaccessible from a screen reader but the embodiments access the underlying code of the visual application and create an arrow menu for the screen reader.

Referring to FIG. 5B, an example menu created by the embodiments is shown. Menu 510 is created with two menu items: FCMComposite 1 1 and FCMComposite 1 2. FCMComposite 1 1 corresponds to visual control 508.1 and performs a mouse click substantially at location 89, 97 when selected (@Mouse Click at location 89, 97). FCMComposite 1 2 corresponds to visual control 508.2 and performs a mouse click substantially at location 258, 97 when selected (@Mouse Click at location 258, 97).

The coordinates 89, 97 refer to an x, y coordinate for the top left position of the icon for the first component described in the XML. The coordinates 258, 97 refer to an x, y coordinate for the top left position of the icon for the second component described in the XML.

The mouse-click (in this case) should not be performed at this location specifically, but should be performed in the center of the icon graphic: mouse click at position where x coordinate=X+(½*width of icon graphic) and y coordinate=Y+(½*height of icon graphic).

Thus, for the modified example previously, this would be:
1. First Component—mouse click at position where x coordinate=89+(½*32) and y coordinate=97+(½*32)=105,113.
2. Second Component—mouse click at position where x coordinate=258+(½*32) and y coordinate=97+(½*32)=274,113.

The simulated mouse clicks select the associated visual control and as such the IDE panels will update to display the property panels for the node which the user can access using existing keyboard actions to navigate regular GUI elements.

Further embodiments of the invention are now described. It will be clear to one of ordinary skill in the art that all or part of the logical process steps of one or more embodiments may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of one or more embodiments may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, one or more aspects of the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of one or more embodiments may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:
1. A screen reader system comprising:
a memory;
one or more processors in communication with the memory; and
program instructions executable by the one or more processors via the memory to perform a method, the method comprising:
  locating, by the one or more processors, markup code for a visual interface containing an input node, wherein the visual interface comprises a proprietary application which is a message flow application that is not operating system based, and wherein the visual interface comprises a visual integrated development environment;
  creating, by the one or more processors, a screen reader menu for the visual interface to view in the visual interface of the screen reader system;
  extracting, by the one or more processors, properties from the markup code, the properties including a visual control name and a screen location, both corresponding to the input node, wherein the markup code comprises properties of the input node;
  generating, by the one or more processors, based on the properties from the markup code of the proprietary application, a menu item in the screen reader menu corresponding to the input node, wherein a location of the generated menu item is different from a screen location corresponding to the input node in the properties of the markup code, wherein the generating provides accessibility to a user utilizing the screen reader system to the input node and to an underlying action associated with selecting the input node, at the screen location corresponding to the input node, through the generated menu item, wherein at the input node and the underlying action associated with selecting the input node, at the screen location corresponding to the input node-is inaccessible by the user utilizing the screen reader system, through the visual interface of the screen reader system, prior to the generating, based on the underlying action comprising the proprietary application, because the visual interface is not operating system based, wherein the underlying action is selected from the group consisting of 1: a left mouse click, a right mouse click, and a hover, and wherein the generating enables the user of the screen reader system to achieve a focus on the input node via the generated menu item within the visual interface of the screen reader system;

simulating, by the one or more processors, a selection of the input node at the screen location corresponding to the input node, based on obtaining a selection the generated menu item in the screen reader menu by the user, wherein the selection of the generated menu item comprises triggering the underlying action associated with the input node, at the screen location corresponding to the input node; and rendering, by the one or more processors, the generated menu item in the screen reader system such that the user can access the input node via the generated menu item to make inputs.

2. The screen reader system according to claim 1, the method further comprising:

locating at least one dependent visual control depending from the input node; and extracting, from the markup code, a dependent visual control name and screen location, both corresponding to the at least one dependent visual control.

3. The screen reader system according to claim 2, the method further comprising:

extracting, from the markup code, further descriptive information relating to the at least one dependent a visual control; and making such further descriptive information available from the generated menu item.

4. The screen reader system according to claim 2, the method further comprising:

locating at least one doubly dependent visual control depending from the at least one dependent visual control; and extracting from the markup code a doubly dependent visual control name and screen location, both corresponding to the at least one doubly dependent visual control.

5. The screen reader system according to claim 4, the method further comprising:

extracting, from the markup code, further descriptive information relating to the doubly dependent visual control; and making such further descriptive information available from the generated menu item.

6. The screen reader system according to claim 1, the method further comprising:

extracting, from the markup code, further descriptive information relating to the input node; and making such further descriptive information available from the generated menu item.

7. A computer-implemented method for a screen reader comprising:

locating markup code for a visual interface containing an input node, wherein the visual interface comprises a proprietary application which is a message flow application that is not operating system based, and wherein the visual interface comprises a visual integrated development environment;

creating a screen reader menu for the visual interface to view in the visual interface of the screen reader;

extracting properties from the markup code, the properties including a visual control name and a screen location, both corresponding to the input node, wherein the markup code comprises properties of the input node;

generating, based on the properties from the markup code of the proprietary application, a menu item in the screen reader menu corresponding to an input node, wherein a location of the generated menu item is different from a screen location corresponding to the input node in the properties of the markup code, wherein the generating provides accessibility to a user utilizing the screen reader to the input node and to an underlying action associated with selecting the input node, at the screen location corresponding to the input node, through the generated menu item, wherein at the input node and the underlying action associated with selecting the input node, at the screen location corresponding to the input node is inaccessible by the user utilizing the screen reader, through the visual interface of the screen reader, prior to the generating, based on the underlying action comprising the proprietary application, because the visual interface is not operating system based, wherein the underlying action is selected from the group consisting of: a left mouse click, a right mouse click, and a hover, and wherein the generating enables the user of the screen reader to achieve a focus on the input node via the generated menu item within the visual interface of the screen reader;

simulating a selection of the input node at the screen location corresponding to the input node, based on obtaining a selection of the generated menu item in the screen reader menu by the user, wherein the selection of the generated menu item comprises triggering the underlying action associated with the input node, at the screen location corresponding to the input node; and rendering the generated menu item in the screen reader such that the user can access the input node via the generated menu item to make inputs.

8. The computer-implemented method according to claim 7, further comprising locating at least one dependent visual control depending from the input node, and extracting from the markup code the at least one dependent visual control name and screen location, both corresponding to the input node.

9. The computer-implemented method according to claim 8, further comprising extracting from the markup code further descriptive information relating to the at least one visual control and making such further descriptive information available from the generated menu item.

10. The computer-implemented method according to claim 8, further comprising locating at least one doubly dependent visual control depending from the at least one dependent visual control, and extracting from the markup code a doubly dependent visual control name and screen location, both corresponding to the at least one doubly dependent visual control.

11. The computer-implemented method according to claim 7, further comprising extracting from the markup code further descriptive information relating to the input node and making such further descriptive information available from the generated menu item.

12. A computer program product for a screen reader, the computer program product comprising a computer readable storage medium having program instructions embodied therein, the program instructions executable by a processor to cause the processor to:

locate markup code for a visual interface containing an input node, wherein the visual interface comprises a proprietary application which is a message flow application that is not operating system based, and wherein the visual interface comprises a visual integrated development environment;

create a screen reader menu for the visual interface to view in the visual interface of the screen reader;

extract properties from the markup code, the properties including a visual control name and a screen location, both corresponding to the input node, wherein the markup code comprises properties of the input node;

generate, based on the properties from the markup code of the proprietary application, a menu item in the screen reader menu corresponding to an input node, wherein a location of the generated menu item is different from a screen location corresponding to the input node in the properties of the markup code, wherein the generating provides accessibility to a user utilizing the screen reader to the input node and to an underlying action associated with selecting the input node, at the screen location corresponding to the input node, through the generated menu item, wherein at the input node and the underlying action associated with selecting the input node, at the screen location corresponding to the input node is inaccessible by the user utilizing the screen reader, through the visual interface of the screen reader, prior to the generating, based on the underlying action comprising the proprietary application, because the visual interface is not operating system based, wherein the underlying action is selected from the group consisting of: a left mouse click, a right mouse click, and a hover, and wherein the generating enables the user of the screen reader to achieve a focus on the input node via the generated menu item within the visual interface of the screen reader;

simulate a selection of the input node at the screen location corresponding to the input node, based on obtaining a selection of the generated menu item in the screen reader menu by the user, wherein the selection of the generated menu item comprises triggering the underlying action associated with the input node, at the screen location corresponding to the input node; and render the generated menu item in the screen reader such that the user can access the input node via the generated menu item to make inputs.

13. The computer program product according to claim 12, wherein the processor is to locate at least one dependent visual control depending from the input node, and extract from the markup code the at least one dependent visual control name and screen location, both corresponding to the input node.

14. The computer program product according to claim 13, wherein the processor is further to locate at least one doubly dependent visual control depending from the at least one dependent visual control, and extract from the markup code a doubly dependent visual control name and screen location, both corresponding to the at least one doubly dependent visual control.

15. The computer program product according to claim 12, wherein the processor is further to extract from the markup code further descriptive information relating to the input node and make such further descriptive information available from the generated menu item.

* * * * *